US012772261B2

(12) United States Patent
Park et al.

(10) Patent No.: US 12,772,261 B2
(45) Date of Patent: Oct. 20, 2026

(54) DATABASE FOR EFFICIENT CALCULATION OF AGGREGATED DATA UNITS IN WIRELESS COMMUNICATION

(71) Applicant: TP-LINK SYSTEMS, INC., Irvine, CA (US)

(72) Inventors: Seong Park, San Jose, CA (US); Foo Keong Tang, San Jose, CA (US); Sonali Bagchi, San Jose, CA (US); Mao Yu, San Jose, CA (US)

(73) Assignee: TP-LINK SYSTEMS, INC., Irvine, CA (US)

( * ) Notice: Subject to any disclaimer, the term of this patent is extended or adjusted under 35 U.S.C. 154(b) by 294 days.

(21) Appl. No.: 18/790,602

(22) Filed: Jul. 31, 2024

(65) Prior Publication Data

US 2026/0040324 A1 Feb. 5, 2026

(51) Int. Cl.
*H04W 72/232* (2023.01)
*H04L 5/00* (2006.01)

(52) U.S. Cl.
CPC ......... *H04W 72/232* (2023.01); *H04L 5/0055* (2013.01); *H04L 5/0094* (2013.01)

(58) Field of Classification Search
CPC .. H04L 5/0055; H04L 5/0094; H04W 28/065; H04W 72/232
See application file for complete search history.

(56) References Cited

U.S. PATENT DOCUMENTS 9,467,895 B2 * 10/2016 Ram ..................... H04L 47/365
2009/0327716 A1 * 12/2009 Raju ..................... H04L 9/3242 713/168
2015/0281109 A1 * 10/2015 Saxena ................. H04L 49/901 370/412
2019/0253227 A1 * 8/2019 Chu .................... H04L 27/2601
2019/0335361 A1 * 10/2019 Lee ..................... H04W 28/065
(Continued)

FOREIGN PATENT DOCUMENTS

WO WO-2017217766 A1 * 12/2017 .......... H04W 74/002

OTHER PUBLICATIONS

Ahn, "Wireless Communication Method Using Aggregate MPDU, and Wireless Communication Terminal Using Same" English Machine Translation of Ahn (WO 2017/217766A1), Clarivate Analytics, pp. 1-29 (Year: 2026).*

*Primary Examiner* — Thomas R Cairns
*Assistant Examiner* — Kai Chang
(74) *Attorney, Agent, or Firm* — Evergrow Law LLP; Jin Zhang

(57) ABSTRACT

In some embodiments, in response to a transmission opportunity, an apparatus traverses a database to determine one or more MAC protocol data units (MPDUs) to be transmitted and a total aggregated MDPU length for a transmission frame. The database includes multiple entries each comprising at least a first field indicating a pointer to a respective MPDU and a second field indicating a length of the respective MPDU. The apparatus determines the one or more MPDUs to be transmitted based on the first fields of the plurality of entries in the MAC database, and the total aggregated MPDU length based on the second field in the database. One or more MAC service data units (MSDUs) in each of the MPDUs are populated using a linked list that uses existing MSDU descriptors as received without copying or re-creating MSDU descriptors.

23 Claims, 8 Drawing Sheets

(56) References Cited

U.S. PATENT DOCUMENTS

| | | | | |
|---|---|---|---|---|
| 2020/0153558 | A1* | 5/2020 | Sugaya | H04L 1/0047 |
| 2021/0037596 | A1* | 2/2021 | Kim | H04L 1/1685 |
| 2021/0143951 | A1* | 5/2021 | Chu | H04L 1/1621 |
| 2022/0060284 | A1* | 2/2022 | Han | H04L 1/1614 |
| 2024/0022649 | A1* | 1/2024 | Sun | H04L 69/06 |
| 2025/0133594 | A1* | 4/2025 | Peng | H04W 74/0816 |

* cited by examiner

DATABASE FOR EFFICIENT CALCULATION OF AGGREGATED DATA UNITS IN WIRELESS COMMUNICATION

FIELD

This technology relates to wireless communication network, and more particularly to systems and methods for media access control.

BACKGROUND

Wireless local area network (WLAN) protocols, such as Institute for Electrical and Electronics Engineers (IEEE) 802.11, allow for various devices (stations) to communicate with each other in a wireless communication network. Whereas the protocols specify the signaling in over the air (OTA) medium, many underlying implementation details in each device are left to the device manufacturers. For example, when a transmission opportunity (TXOP) becomes available to a device wishing to transmit data, the device may need to transmit the transmission data within a limited amount of time as allowed under a given wireless protocol. As such, there is a desire for the device to prepare the data to be transmitted in less computation time.

SUMMARY

The present disclosure relates to techniques for efficient calculation of aggregated data units in wireless communication. In an embodiment, the techniques provide a software and/or hardware implemented method for communicating packets in a wireless communication network, the method comprising, at a device: aggregating a plurality of media access control (MAC) protocol data units (MPDUs), each having a respective length, to update a database comprising a plurality of entries, each entry comprising a first field indicating a pointer to a respective MPDU and a second field indicating a length of the respective MPDU. The aggregating comprises, for each MDPU of the plurality of MPDUs: determining a length of the MPDU; and generating a respective entry in the database for the MPDU, wherein the first field of the respective entry contains a pointer to a descriptor of the MPDU and the second field of the respective entry contains the length of the MPDU. The method further includes: traversing the database to determine one or more MPDUs to be transmitted based on the first fields of the plurality of entries; determining a total aggregated MPDU length based on respective lengths of the one or more MPDUs to be transmitted; determining a frame containing the one or more MPDUs to be transmitted and at least a field indicating the total aggregated MPDU length; and transmitting the frame to over the air (OTA) medium.

In an embodiment, the techniques provide an apparatus for communication in a wireless network, the apparatus comprising one or more processors configured to perform one or more operations comprising: aggregating a plurality of MPDUs, each having a respective length, to update a database comprising a plurality of entries, each entry comprising a first field indicating a pointer to a respective MPDU and a second field indicating a length of the respective MPDU. The aggregating comprises, for each MDPU of the plurality of MPDUs: determining a length of the MPDU; and generating a respective entry in the database for the MPDU, wherein the first field of the respective entry contains a pointer to a descriptor of the MPDU and the second field of the respective entry contains the length of the MPDU. The one or more operations further include: traversing the database to determine one or more MPDUs to be transmitted based on the first fields of the plurality of entries; determining a total aggregated MPDU length based on respective lengths of the one or more MPDUs to be transmitted; determining a frame containing the one or more MPDUs to be transmitted and at least a field indicating the total aggregated MPDU length; and transmitting the frame to OTA medium.

In an embodiment, the techniques provide a software and/or hardware implemented method for communicating packets in a wireless communication network, the method comprising, at a device, in response to a transmission opportunity: traversing a database associated with a receiver device, the receiver device associated with the transmission opportunity, wherein the database comprises a plurality of entries, each entry comprising a first field indicating a pointer to a respective MPDU and a second field indicating a length of the respective MPDU. The traversing comprises: determining one or more MPDUs to be transmitted based on the first fields of the plurality of entries in the database; and determining a total aggregated MPDU length based on respective lengths of the one or more MPDUs to be transmitted. The method further includes: determining a frame containing the one or more MPDUs to be transmitted and at least a field indicating the total aggregated MPDU length; and transmitting the frame to OTA medium.

In an embodiment, the techniques provide a method for managing data packets in a wireless communication network, the method comprising, at a device: receiving a plurality of MSDUs for transmission, wherein each MSDU of the plurality of MSDUs is stored in a respective memory location and represented by a respective MSDU descriptor; aggregating the plurality of MSDUs to determine a plurality of MPDUs each comprising one or more MSDUs from the plurality of MSDUs; and updating a plurality of entries of a database each entry comprising a first field containing a pointer to a respective MPDU of the plurality of MPDUs, where the pointer indicates a memory location of the MSDU descriptor of a first MSDU in the respective MPDU. The MSDU descriptor of each of the plurality of MSDUs has a next field containing the memory location of the MSDU descriptor of a succeeding MSDU in the plurality of MSDUs. In the manner as described, the plurality of MPDUs are accessible by traversing the database in a manner in which, for each MPDU of the plurality of MPDUs: (1) the first MSDU in the MPDU is accessible by the first field of a corresponding entry to the MPDU in the database; and (2) if the MPDU has more than one MSDU, remaining MSDUs in the MPDU are accessible by the next fields in the MSDU descriptors of the one or more MSDUs in the MPDU.

BRIEF DESCRIPTION OF DRAWINGS

Additional embodiments of the disclosure, as well as features and advantages thereof, will become more apparent by reference to the description herein taken in conjunction with the accompanying drawings. The components in the figures are not necessarily to scale. Moreover, in the figures, like-referenced numerals designate corresponding parts throughout the different views.

DETAILED DESCRIPTION

Figure 1:
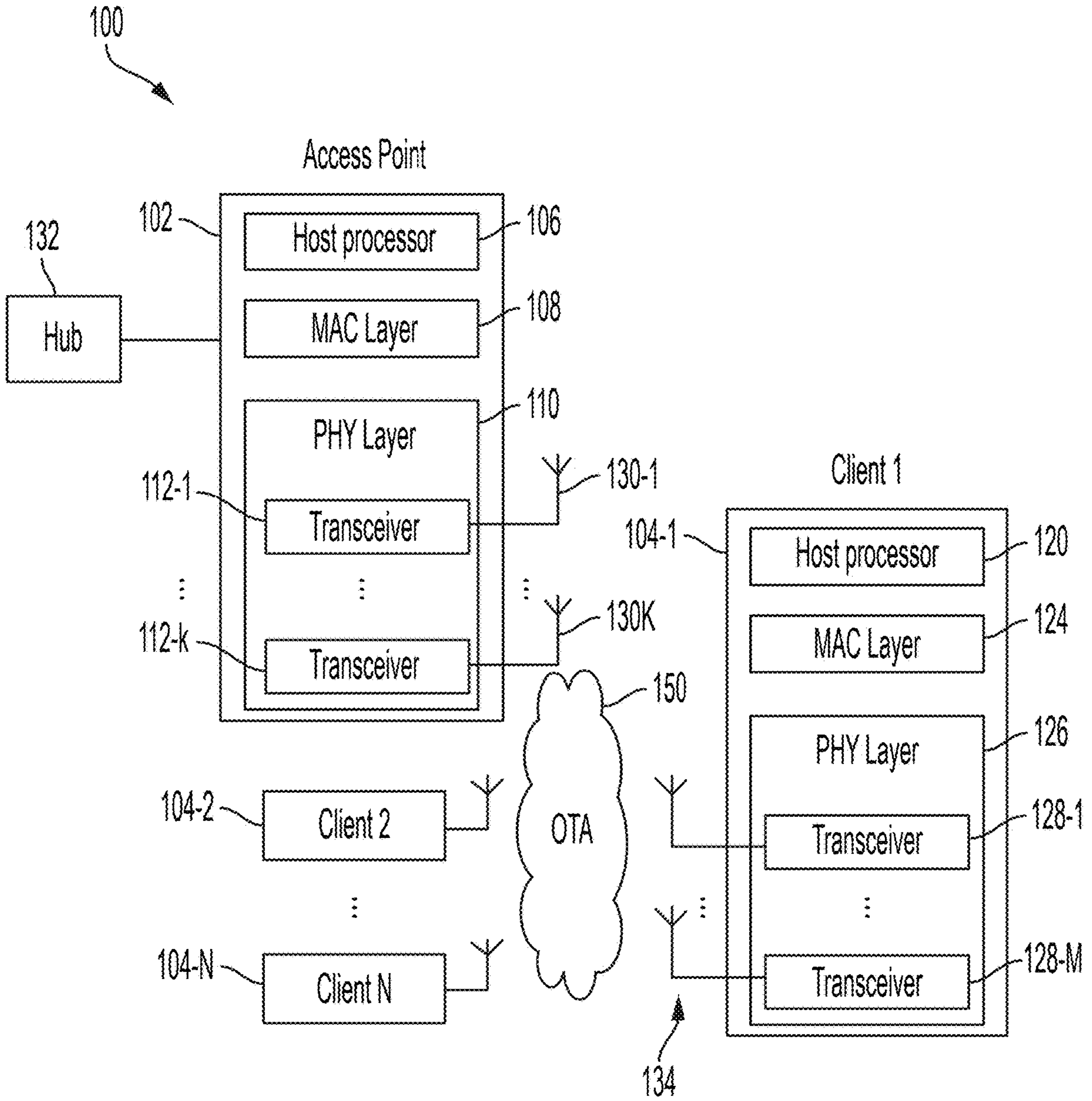
FIG. 1 illustrates a wireless communication network, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended. It should be further appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect. In the present disclosure, the MAC and the MAC layer may be interchangeable. The PHY and the PHY layer may be interchangeable.

FIG. 1 illustrates a wireless communication network, according to some embodiments. In some embodiments, a wireless communication network 100 (e.g., WLAN) may facilitate communications between one or more access point (AP) device (e.g., 102) and one or more client devices (e.g., 104-1, 104-2, . . . 104-N). Each of the AP and client devices may be configured to receive or transmit frames (packets) from/to another device (e.g., AP or client devices) via over the air (OTA) medium (e.g., 150). These communication devices may be communicating with each other in a communication protocol, e.g., IEEE 802.11, or other suitable wireless protocols.

As shown in FIG. 1, AP device 102 may include one or more antennas (e.g., 130-1, . . . 130-K) configured to transmit or receive radio frequency (RF) signals to/from other devices in the wireless communication network 100. AP device 102 may include a PHY layer 110, a MAC layer 108, and a host processor 106, which are configured to generate or process RF signals in lower to upper network layers, respectively. For example, PHY 110 may be configured to implement physical layer functions. PHY 110 may also include one or more transceivers (e.g., 112-1, . . . 112-K) configured to convert between baseband signals and RF signals, where RF signals are transmitted or received via the one or more antennas, e.g., 130-1, . . . 130-K. In a non-limiting example, in 802.11, PHY 110 may be configured to receive wireless frames, e.g., MPDU (MAC protocol data unit) from the MAC, remove the preamble and PHY header and extract the baseband signals. Similarly, PHY 110 may add the preamble and the PHY header to the baseband signals to generate wireless frames (packets), e.g., MPDUs, for passing to the MAC layer.

In FIG. 1, MAC 108 may be configured to implement MAC layer functions including processing frames (packets) received from the PHY layer and converting to data frames for upper layer(s), or vice versa. For example, in 802.11, MAC 108 may extract MSDUs (MAC service data unit) payload encapsulated in the frame body of MPDUs for the upper layers, where MPDUs are received from the PHY layer. Similarly, MAC 108 may receive MSDUs from upper layers and convert them to MPDUs for the PHY layer. Host processor 106 may be coupled to MAC 108 and PHY 110 to process data via respective layers. Host processor 106 may also be configured to implement one or more applications and transmit/receive data to/from MAC 108.

As shown in FIG. 1, each of the components, e.g., host processor 106, MAC 108, PHY 110, as well as transceivers (112-1, . . . 112-K) may include circuitry, e.g., one or more integrated circuits (ICs). Thus, one or more functions of the MAC and PHY layers may be implemented in hardware. Alternatively, and/or additionally, one or more functions of the MAC and PHY layers may be implemented in software, e.g., via executing programing instructions (e.g., stored in memory). For example, each of MAC 108 and PHY 110 may include one or more processors, e.g., CPUs, to execute programming instructions in a memory.

With further reference to FIG. 1, AP device 102 may be connected to a hub 132 (e.g., a wired router, a modem) which provides the Internet services (e.g., via an ISP). AP device 102 may provide Internet, via hub 132, to one or more client devices (e.g., 104-1, 104-2, . . . 104-N) that are connected to the AP device wirelessly, e.g., via OTA medium 150. Each of the client devices may have a similar configuration as the AP device 102. For example, client device 104-1 may include a host processor 120, a MAC layer 124, a PHY layer 126.

Similar to AP device 102, a client device (e.g., 104-1, 104-2, . . . 104-N) may include one or more antennas (e.g., 134) configured to transmit or receive RF signals to/from other devices in the wireless communication network 100. PHY layer 126, MAC layer 124, and host processor 120 may be configured to generate or process RF signals in lower to upper network layers, respectively. For example, PHY layer 126 may be configured to implement physical layer functions. PHY layer 126 may include one or more transceivers (e.g., 128-1, . . . 128-M) configured to convert between baseband signals and RF signals, where RF signals are transmitted or received via the one or more antennas 134. In a non-limiting example, in 802.11, PHY layer 126 may receive wireless frames, e.g., MPDUs from MAC layer 124, remove the preamble and PHY header and extract the baseband signals. Similarly, PHY 126 may add the preamble and the PHY header to the baseband signals to generate wireless frames (packets), e.g., MPDUs, for passing to MAC layer 124.

In FIG. 1, MAC layer 124 may be configured to implement MAC layer functions including processing frames (packets) received from the PHY layer and converting to data frames for upper layer(s), or vice versa. For example, in 802.11, the MAC layer may extract MSDUs payload encapsulated in the frame body of MPDUs for the upper layers, where MPDUs are received from the PHY layer. Similarly, the MAC layer may receive MSDUs from the upper layers and convert them to MPDUs for the PHY layer. Host processor 120 may be coupled to MAC layer 124 and PHY layer 126 to process data via respective layers. Host processor 120 may also be configured to implement one or more applications and transmit/receive data to/from MAC layer 124.

Similar to AP device 102, each of the components in a client device, e.g., host processor 120, MAC layer 124, PHY layer 126, as well as transceivers (128-1, . . . 128-M) may include circuitry, e.g., one or more integrated circuits (ICs). Thus, one or more functions of MAC and PHY layers may be implemented in hardware. Alternatively, and/or additionally, one or more functions of the MAC and PHY layers may be implemented in software, e.g., via executing programing instructions (e.g., stored in memory) by MAC layer 124, PHY layer 126, host processor 120, or any other suitable processors. Client devices 104-2, . . . 104-N may each have a similar configuration as client device 104-1. Although one AP device 102 is shown in FIG. 1, it is appreciated that there can be multiple AP devices in the wireless communication network 100. Further, any suitable number of client device may be possible as supported in current or later developed protocols.

Figure 2:
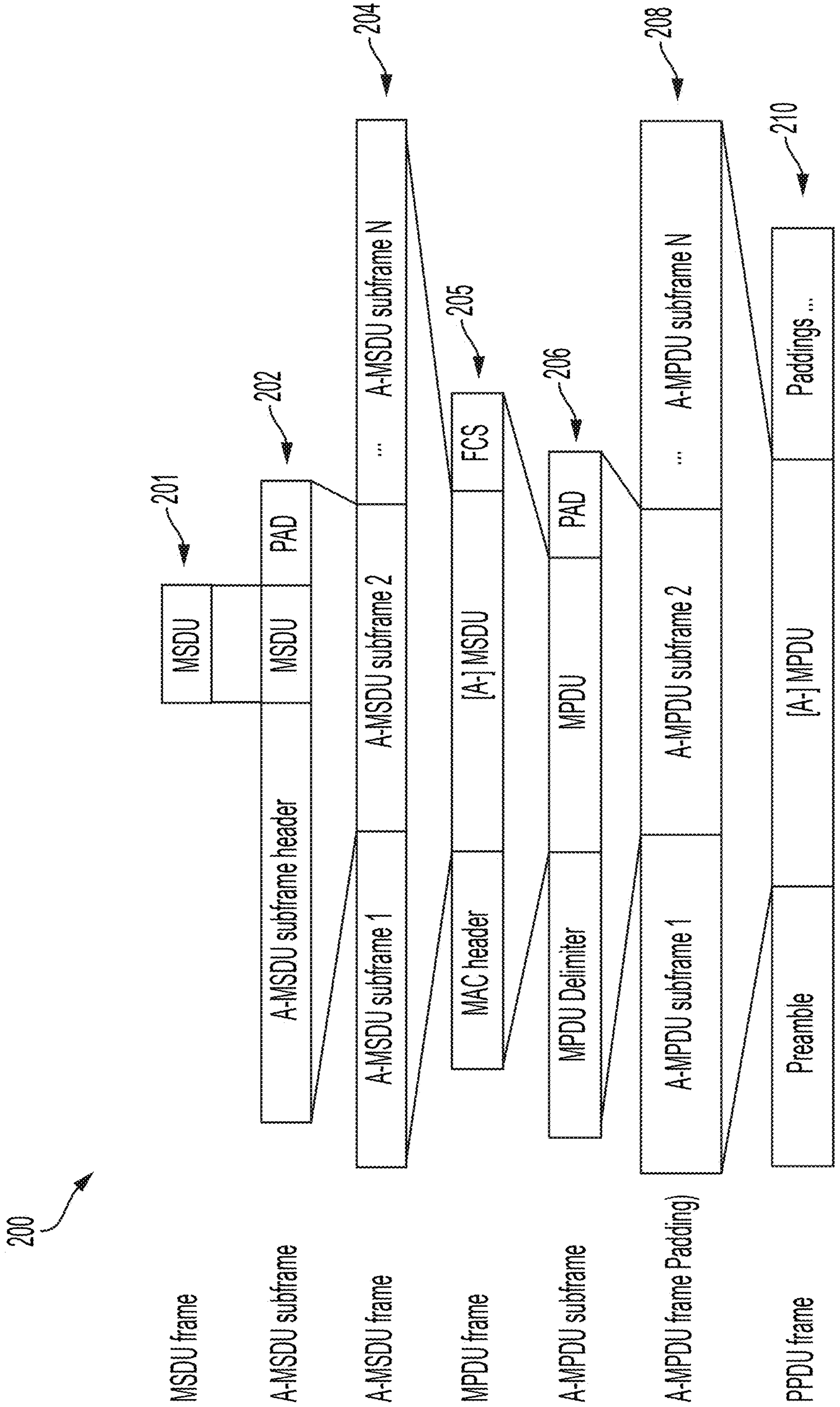
FIG. 2 is a scheme diagram of aggregated data units at different levels, according to some embodiments.

In some embodiments, a wireless frame transmitted between devices may include data units that may be aggregated at multiple levels. FIG. 2 is a scheme diagram of aggregated data units, according to some embodiments. As shown, a data unit may be a data frame at different levels. For example, a data unit may be an MSDU frame (201). A data unit may be an MPDU frame (205), which is aggregated MSDUs. Aggregation of multiple data units may include grouping data units (e.g., MSDUs) to be transmitted into different MPDUs, each containing one or more MSDUs. The aggregation may further include grouping multiple MPDUs into an aggregated MPDU to fill up a frame. For example, MSDU 201, maybe the smallest data unit, which includes MSDU payload only. Multiple MSDUs may be aggregated into an aggregated MSDU (A-MSDU), e.g., A-MSDU frame 204 comprising multiple A-MSDU subframes 202 transmitted together in a wireless frame. An MSDU subframe 202 includes an A-MSDU subframe header and padding per MSDU. In a non-limiting example, an A-MSDU subframe header may include destination address (DA), source address (SA), and length of MSDU payload, whereas padding may include four-byte alignment or other suitable alignment. In some embodiments, an A-MSDU may be encapsulated in an MPDU payload, e.g., MPDU frame 205. As shown, an MPDU frame 205 may additionally include other information, such as MPDU header, and FCS (frame check sequence). Multiple A-MPDU subframes may also be aggregated into an aggregated MPDU, e.g., A-MPDU frame 208, where an A-MPDU subframe (e.g., 206) includes an MPDU frame 205 with added MPDU delimiter and padding. Aggregated MPDUs (e.g., A-MPDU frame 208) may be encapsulated into a PPDU frame with preamble and padding, such as PPDU frame 210.

Under some wireless protocols, the transmitter device may be required to send a transmission time in the beginning of a transmission (e.g., in a L-SIG field following training fields) to tell the other non-recipient devices how much time to wait for the OTA medium to be idle while the transmission is in session. The transmission time may be associated with the amout of data to be transmisted, and thus, the length of data.

The inventors have recognized and acknowledged that existing systems consume resources in both memory and computing power in constructing MSDUs and MPDUs to be transmitted and computing the total length of aggregated MPDUs (and thus the transmission time for the amount of data to be transmitted). For example, in constructing multiple MSDUs and MPDUs in a transmission queue (which includes data to be transmitted), a device determines what MSDUs and/or MPDUs are to be included in a wireless frame for transmission. The device needs to keep track of each of the MSDUs, often stored in MSDU descriptors. An MSDU descriptor may include a pointer to a memory location of the MSDU and other information about the MSDU. In some examples, the MSDU descriptors are created by the device when receiving the MSDUs for transmission from an upper layer (e.g., network layer, host processor 106, 120 (FIG. 1)). While aggregating data units, e.g., MSDUs, the MSDU descriptors of aggregated MSDUs are often duplicated and arranged in contiguous memory of entries in the transmission queue for fast access of accumulation. This results in creating copies of MSDU descriptors, which consumes memory space.

Further, a device may have limited time to calculate aggregated data units before transmitting. For example, a device may need to determine the total length of aggregated data units at the last minute right before a device is permitted to transmit with transmission opportunity (TXOP). This is because the device may not know exactly how many MPDUs are pending transmission until right before the device is permitted to transmit. The TXOP usually leaves a very short time period, e.g., a few micro-seconds in slot time, for the transmitter device to initiate the transmission. This short time period includes the time for constructing the signal information to be transmitted and computing the total length of the data to be transmitted. This process may be time consuming, making it a challenge for the MAC to transmit within the available TXOP. For example, in determining the total length of aggregated MPDUs (A-MPDU), the MAC of the transmitter device may scan all of the aggregated MPDUs to determine the length of each MPDU, and add the lengths of the MPDUs together. In determining the length of an MPDU, which may include aggregated MSDUs, the MAC may need to scan all of the MSDUs within the MPDU payload.

Figure 3A:
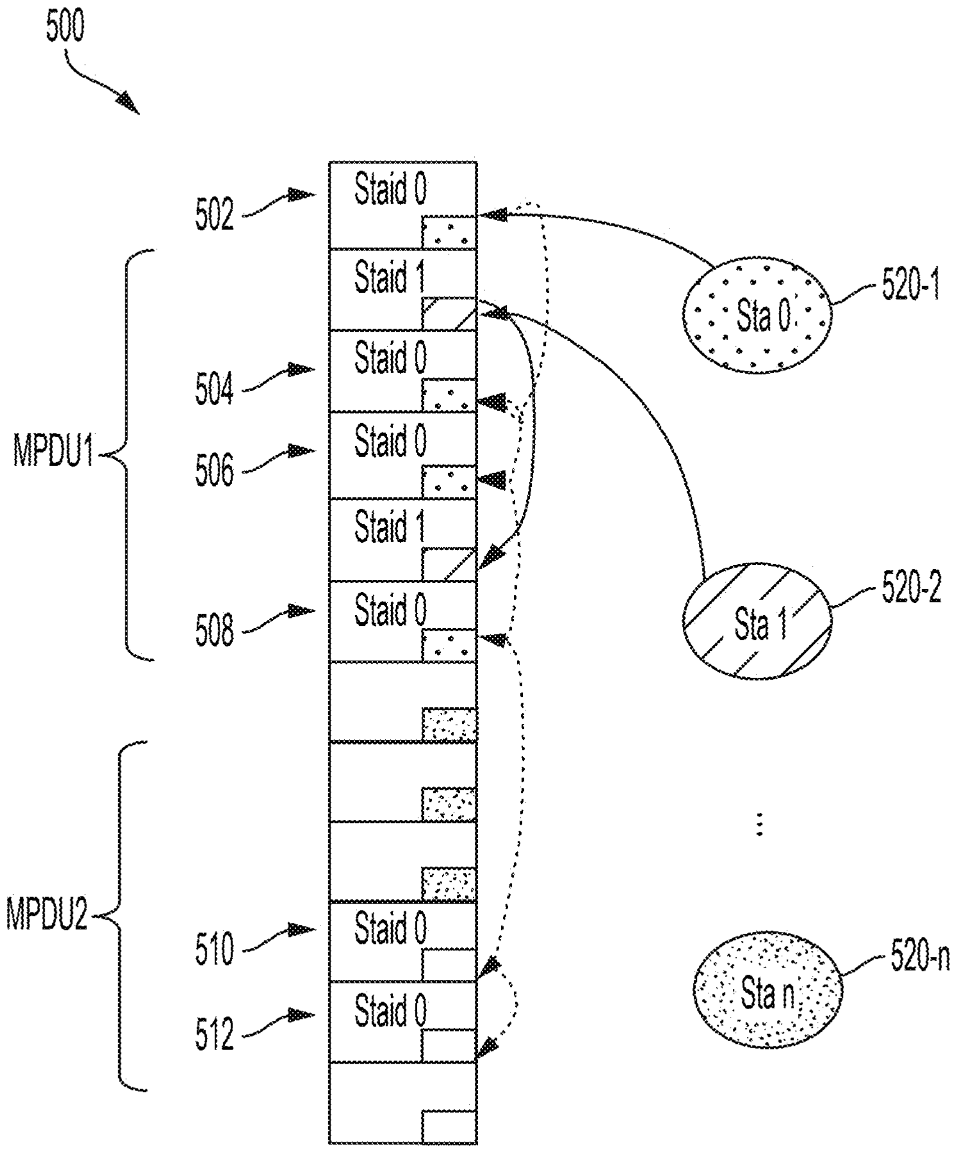
FIG. 3A illustrates a queue of consecutive MSDU descriptors in the order as the MSDUs are received, according to some embodiments.

Accordingly, the inventors have developed technologies for managing the aggregated data units and determining the total aggregated data unit length using less processing time and less memory. FIG. 3A illustrates a queue of consecutive MSDU descriptors in the order as the MSDUs are received, according to some embodiments. As shown in FIG. 3A, a plurality of MSDUs are received, e.g., at the MAC, where the MSDUs are associated with different devices (stations, or APs). In some embodiments, the MAC receives the MSDUs from the upper layer (e.g., network layer, L3) for transmission to respective STAs, e.g., 520-1, 520-2, . . . 520-*n*. These MSDU descriptors may be stored in consecutive memory locations in the order the MSDUs are arrived.

In FIG. 3A, the linked list may be built to allow access of aggregated MPDUs (and MSDUs) without copying information of the MSDU descriptors. For example, linked list 500 includes the existing MSDU descriptors for the MSDUs for STA 0 (e.g., 520-1), where a pointer (e.g., next field) for each descriptor is updated to point to the memory location of the next MSDU descriptor. In the example shown, linked list 500 for STA 0 may include a base MSDU descriptor 502, which also includes a pointer to the next MSDU descriptor 504. MSDU descriptor 504 includes a pointer to the next MSDU descriptor 506, so on and so forth. Having described the linked list 500 herein, it is appreciated that the linked list 500 is virtual in that the elements in the linked list (e.g., MSDU descriptor) are existing MSDU descriptors that are created as the MSDUs are received, and as such, the linked list does not take any additional memory space itself.

In some embodiments, aggregating MPDUs may include aggregating MSDUs. With reference to FIG. 3A, aggregating MPDUs for device STA 0 may include grouping the multiple MSDUs for STA 0 into different MPDUs, e.g., MPDU1, MPDU2. This grouping may depend on how many MSDUs may be allowed in an MPDU. For example, the MAC may determine how many MSDUs are grouped into an aggregated MSDU (A-MSDU, or an MPDU) based on the MPDU length and the lengths of the MSDUs. In this example, MSDUs represented by MSDU descriptors 502, 504, 506 are aggregated into MPDU1; MSDUs represented by MSDU descriptors 508, 510, 512 are aggregated into MPDU2.

Figure 3B:
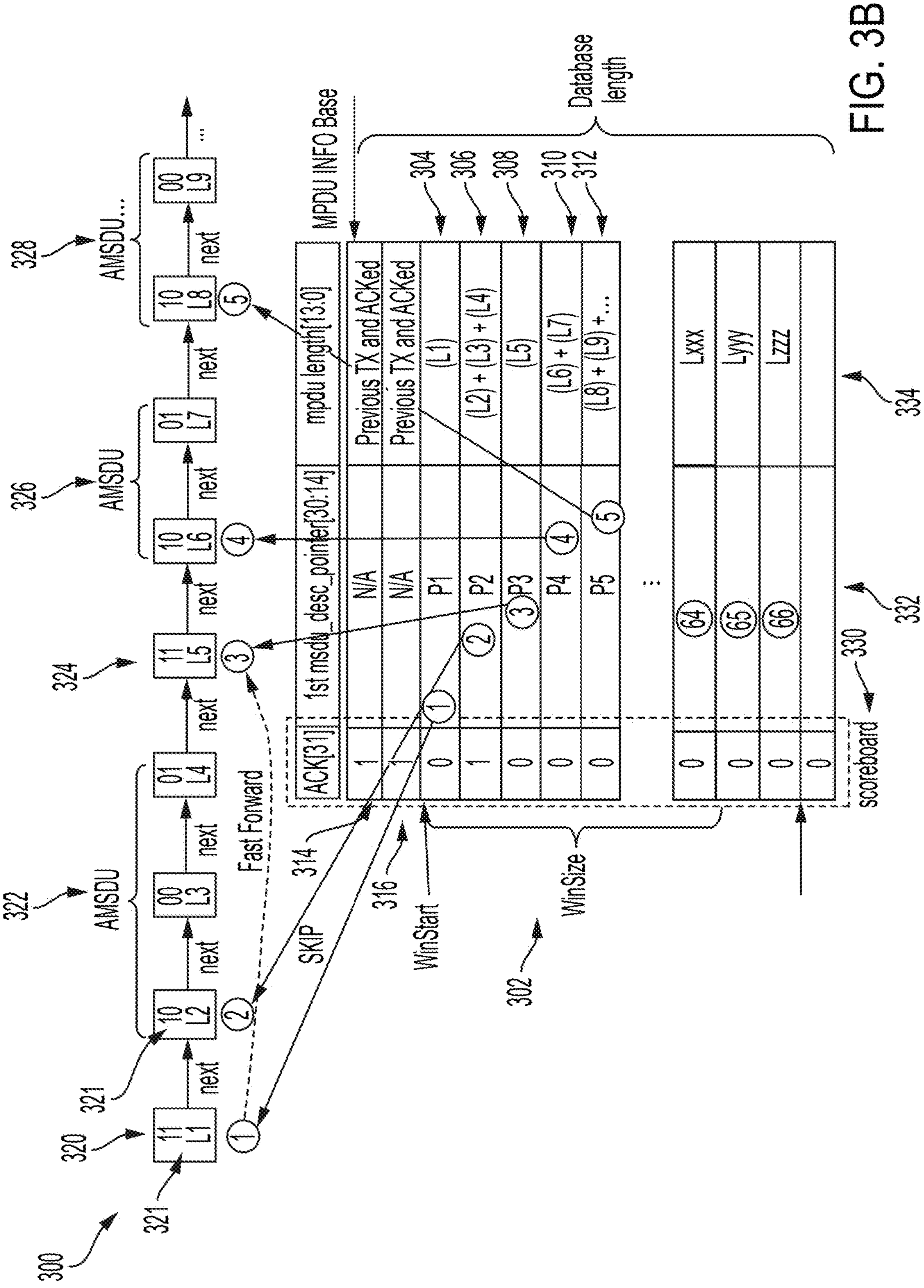
FIG. 3B illustrates a linked list of MSDU descriptors as a result of aggregation of data units and a database containing information related to multiple aggregated data units for transmission, according to some embodiments.

In FIG. 3B, linked list 300 may be the result of aggregation of data units (e.g., MSDUs represented by MSDU descriptors L1, L2, L3, L4, L5, L6, L7, L8, L9) in a manner as described above and further herein. Linked list 300 is similar to linked list 500 (FIG. 3A). In some examples, each descriptor may include a pointer (e.g., next fields) that points to the descriptor of the succeeding MSDU. For example, MSDU descriptor L2 may include a pointer that points to descriptor L3. As the result of aggregation, the MSDUs representec by MSDU descriptors L1-L9 may be grouped into multiple MPDUs, e.g., 320, 324, 326, 328, where each MDPU may be a single-MSDU MPDU or an aggregated MSDU containing one or more MSDUs. For example, MPDU 320 is a single-MSDU MPDU containing the single MSDU represented by L1, whereas MPDU 322 includes aggregated MSDUs represented by L2, L3, and L4. MPDU 324 is a single-MSDU MPDU containing the single MSDU represented by L5, whereas MPDU 326 includes aggregated MSDUs represented by L6 and L7.

In some embodiments, aggregated MPDUs may be constructed using a database as will be described herein. FIG. 3B illustrates a database 302, e.g., MPDU information database containing information related to multiple aggregated MPDUs for transmission, according to some embodiments. Database 302 may be implemented in any of the devices (e.g., any device shown in FIG. 1) and created/updated as the result of aggregation of data units. The database consumes little memory and enables fast computing of the aggregated data units, including calculating the total aggregated data unit length.

In non-limting examples, database 302 may include multiple entries 304, 306, 308, 310, 312 respectively corresponding to aggregated MPDUs 320, 322, 324, 326, 328 in the linked list 300. Each entry may have multiple fields, such as a pointer field (e.g., 332) that contains a pointer to the MPDU associated with the entry, and a length field (e.g., 334) containing the length of the MPDU associated with the entry. In non-limiting examples, the pointer field of entry 304 may include a pointer P1 that includes a memory location to MPDU 320. In the example shown, MPDU 320 is a single MSDU (e.g., L1). In case of single MSDU in an MPDU, the pointer (e.g., P1) may point to the descriptor of the single MSDU (e.g., L1). The length field 334 for entry 304 may include a value indicating the length of MPDU 320, which is represented by (L1), where notion "(x)" stands for the length of MSDU represented by the MSDU descriptor x.

In other examples, in case of aggregated MSDUs in an MPDU, the pointer (e.g., P2) may point to the descriptor of the first MSDU in the MPDU (e.g., L2 in MPDU 322). The length field in the entry may include a value indicating the length of the MPDU that contains the aggregated MSDUs (e.g., MSDUs represented by descriptors L2, L3, L4) in MPDU 322. In this example, the length of the MPDU 322 is (L2)+(L3)+(L4). Similarly, pointer P4 in the pointer field of entry 310 may include the memory location of MPDU 326 (e.g., pointer to the descriptor of the first MSDU in the MPDU, e.g., the MSDU represented by L6). The length field of entry 310 may include a value indicating the length of the aggregated MSDUs in MPDU 326, e.g., (L6)+(L7).

Returning to linked list 300, each of the MSDU descriptors (e.g., L1-L9) may include a data field 321, which is updated as the data units are aggregated to reflect whether the MSDU is a beginning, middle, or end in an A-MSDU (or MPDU) in which the MSDU resides. For example, data field 321 may include 2 bits to represent four values 00, 01, 10, and 11, where 00 (e.g., in L3, L9) may indicate that the MSDU is in the middle of the MPDU (not the first and not the last); 01 (e.g., in LA, L7) may indicate that the MSDU is the last MSDU in an MPDU; 10 (e.g., in L2, L6, L8) may indicate that the MSDU is the first (start) MSDU in an MPDU; and 11 (e.g., in L1, L5) may indicate that the MSDU is contained in a MPDU having a single MSDU with no MSDU aggregation.

Data fields 321 in the aggregated MDSUs may be used for constructing MPDUs for transmission. For example, if an MSDU is one of AMSDU subframes (e.g., 202 in FIG. 2) in an MPDU (e.g., data field 321 having values 10, 00, 01), a subframe header may be added to the MSDU. In contrast, for an MSDU in an MPDU having a single MSDU (e.g., data field 321 having a value 11), no subframe header may be needed.

With further reference to FIG. 3B, database 302 may enable quick calculation of the total aggregated MPDU length as will be further explained. In constructing a frame for transmission, a MAC may find the start entry in the database, e.g., entry 304 at WinStart position, and retrieve the length field of the start entry. The MAC may traverse the database by scanning the next entry 306 and retrieve the length field in the next entry. The MAC may add the current length and the previous length together to determine a totally length. The MAC may repeat this process by sequentially scanning subsequent entries (e.g., entries 308, 310, 312) in the database. For each entry in the database, the MAC may retrieve the length field of the entry, and add it to the previously calculated total length accumutively. This process may continue until one or more conditions are met. For example, the one or more conditions may include: the maximum number of MPDU allowed (WinSize) is reached, the end of available MPDU entry with zero pointer and value information is reached, or the total length exceeds a maximum total aggregated data unit length.

In some embodiments, each entry in the database 302 may include an additional acknowledgment (ACK) field 330 containing an acknowledgment signal that indicates whether the MPDU associated with the entry has been received by the intended receiver device. In non-limiting examples, the ACK field may have a 1-bit value (e.g., 0 and 1), where value 1 indicates that the associated MPDU has been received by the intended receiver device and value 0 indicates othersise. The ACK field allows the traversal of the database to skip any entry for which the associated MPDU has already been received and acknowleged by the intended receiver device. For example, in scanning an entry in the database 302, the MAC may check whether the ACK field of the entry indicates that the MPDU associated with the entry is received by the receiver device. In response to determining that the ACK field indicates that the associated MPDU is not received by the receiver device (Retry) or not yet transmitted for the first time, the MAC may include the MPDU in constructing the frame for transmission and calculating the total aggregated MPDU length; otherwise, the MAC may skip the entry.

In non-limiting examples, following scanning entry 304, the MAC may determine that the ACK field of entry 306 (having a value of 1) indicates that the MPDU associated with the entry is received by the receiver device already. In this case, the database traversal may skip entry 306 and move to entry 308. As a result, the MPDU 322 associated with entry 306 will be skipped (and not transmitted) and the length of that MPDU will not be counted toward the total aggregated MPDU length.

The ACK field of each entry may also be used to determine the start entry when traversing the database. For example, the start entry may be the first entry in the database for which the ACK field indicates that the associated MPDU is not received by the receiver device, where the ACK fields of the entries before the start entry all indicate their corresponding MPDUs being received. In the example in FIG. 3, the start entry as indicated by WinStart is the first entry in the database for which the ACK field has a value 0.

In some embodiments, the ACK fields in the database may be tracked by the MAC when receiving responses from the receiver device(s). In some embodiments, the device may transmit one or more MPDUs in a frame based on traversing the database such as in embodiments described above and further herein. The device may receive a response to the transmitted frame from the intended receiver device, where the response may include an acknowledgment signal indicating whether the transmitted aggregated MPDUs are received. For example, the device may receive a block acknowledgment (BA) including acknowledgment signals for the MPDUs in the aggregated MPDUs in the frame, and map the block acknowledgment signal to the ACK fields of corresponding entries of the one or more MPDUs in the frame in the database. As such, the ACK field 330 may be a snapshot of a scoreboard (bitmap column) provided by the BA signals (bitmap row).

In some embodiments, traversing the database may further include determining one or more MPDUs to be transmitted at least partially in parallel with determining the total aggregated data unit length. For example, while traversing the database, the MAC may scan each entry in the database (e.g., from the start entry) and use the ACK field of the entry to determine whether the corresponding MPDU to the entry has been received (e.g., from previous transmissions). For example, if the ACK field indicates that the corresponding MPDU is received previously (e.g., has a value 1 as in the above example), the MAC may determine that the corresponding MPDU shoud not be transmitted, and thus the entry is skipped. Otherwise, the MAC may determine that the corresponding MPDU should be transmitted. Subsequently the MAC may add the length of the MPDU to be transmitted accumutively to the total aggregated data unit length.

In some embodiments, while traversing the database and constructing one or more MPDUs to be transmitted, the MAC may further add additional information, e.g., padding, to the one or more MPDUs to be transmitted. Examples of padding may include adding additional information bits to a MPDU to satisfy certain requirements. For example, given a wireless protocol, the MAC may add a non-zero delimiter to each MPDU in the aggregated MPDUs. A delimiter may have a fixed length, e.g., 4 bytes (or other suitable length), to store information such as the MPDU length following the delimiter, error correcting codes, delimiter indicator (signature), the end-of-frame (EOF) indicator indicating whether there are more MPDUs after the delimiter (e.g., EOF=1 and the length of MPDU=0 indicate that there are no more MPDUs after the delimiter). A non-zero delimiter is a delimiter in which the MPDU length has a non-zero value, indicating there is an MPDU following the delimiter. The various padding techniques described herein may be used for a receiver unit (e.g., hardware unit in the MAC) to look for a MPDU in the middle of a frame, or if zero-delimiter with EOF is used (e.g., has a value of 1), the receiver unit may skip the rest of the frame to save power.

Alternatively, and/or additionally, the MAC may add one or more zero-delimiters between MPDUs in the aggregated MPDUs to satisfy a minimum MPDU starting spacing (MMSS), which may be 0.25 μs to 16 μs, other suitable values, or no restrictions. A zero-delimiter may include a MPDU length field that has a value of zero, indicating no MPDUs after the delimiter. In such case, another delimiter may follow. Alternatively, and/or additionally, the MAC may add one or more zero-delimiters to the end of the last MPDU in an aggregated MPDU, to satisfy a requirement, for example, a minimum MPDU length. It is appreciated that various padding techniques may be applicable to traversing the database as described above and further herein.

In some embodiments, the size of the database (e.g., the length of the table in FIG. 3B) may be at least a WinSize, which is the maximum number of MPDUs allowed in a frame. In some embodiments, the length of the table may be larger than a WinSize, allowing the device to traverse the database (to construct a transmission frame), at least partially in parallel to aggregating MPDUs to fill in additional entries in the database. For example, in traversing the database, when the number of entries scanned has reached WinSize, the MAC may start transmitting the MPDUs in the AMPDU. While transmitting the constructed MPDUs, the MAC may, at least paritally in parallel, traverse the database by continuing to receive subsequent MSDUs (e.g., from the upper layer) and add entries in the database (for the next transmission). In some examples, the length of the table may be twice the WinSize, or even longer, such as 3 times, 4 times the WinSize. In some examples, the WinSize may be 32, 64, 128, or any other suitable value depending on the wireless protocols. It is appreciated that various sizes may be possible for the database without diminishing the advantageous and beneifts of the database as described further herein.

Having described various embodiments, it is appreciated that the linked list, e.g., linked list 300, and the database, e.g., database 302 in FIG. 3B, and other variations, methods and applications of the techniques (e.g., FIGS. 4A-5B) disclosed further herein are advantageous over existing systems in determining the total aggregated data unit length. For example, as shown in FIG. 3B, database 302 may be a compact table, in which each entry points to the descriptor of the first MSDU of an MPDU without requiring additional copies of the MSDU descriptors. This results in a compact table, e.g., having only 4 bytes per entry. These four bytes also include a snapshot in the ACK field (e.g., only 1 bit as shown in FIG. 3B).

Further, the entries in the database 302 may be stored in contiguous memory locations, making it more efficient for software or hardware to fill in and scan these entries sequentially and thus requiring less computing time to calculate the total aggregated data unit length. For example, it may be faster to consecutive memory locations than accessing random memory locations, the latter of which often requires looking up the memory address and/or setting the memory address lines. In an example hardware implementation, database entries in consecutive memory locations may be accessed quickly by shifting the memory address by the size of the entry (e.g., 4 bytes as shown in FIG. 3B, or other suitable size). Placing the entries of database 302 in contiguous memory locations may be more feasible in comparing to placing consecutive descriptors together in existing systems because each entry in the database 302 takes little space (e.g., four bytes in the example above). This makes it possible to accommodate thousands of entries (e.g., N×WinSize) in a database.

Further, the linked list (e.g., linked list 500 in FIG. 3A, 300 in FIG. 3B), as the result of aggregation of data units, does not require copies of the MSDU descriptors or take any extra memory space. Instead, each element in the linked list is an MSDU descriptor that existed as the MSDU was received. Besides determining the total aggregated data unit length as described above and further herein, the linked list can also be used to perform other functions related to constructing frames for transmission, such as determining payload pointer for loading, or other suitable functions that use the informatin in each MSDU descriptor.

Figure 4A:
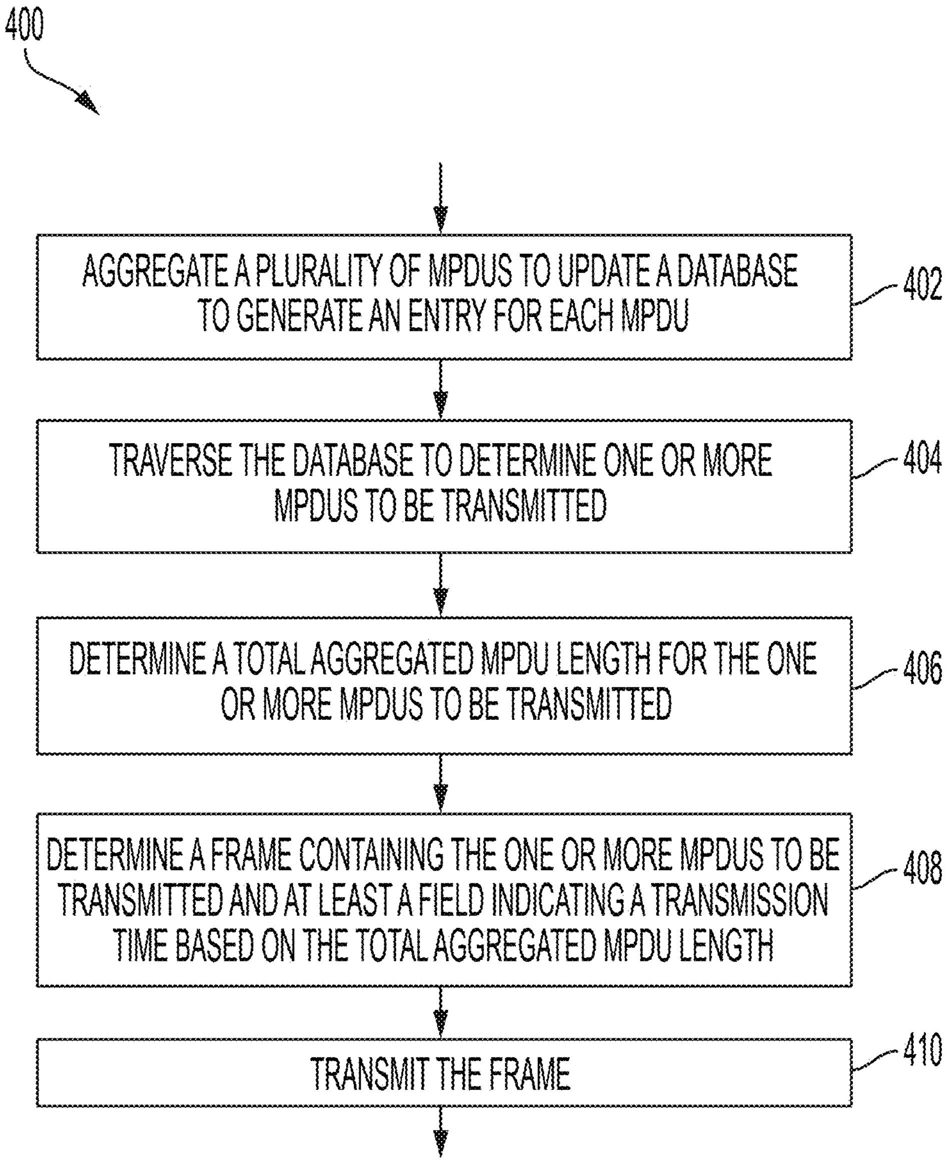
FIG. 4A is a flow diagram of an example process for determining a total aggregated data unit length, according to some embodiments.

FIG. 4A is a flow diagram of an example process 400 for determining a total aggregated MPDU length using the database shown in FIG. 3B, according to some embodiments. Method 400 may be implemented in the MAC of a device, such as any of the device shown in FIG. 1. Method 400 may include aggregating a plurality of MPDUS to update a database, at act 402. The database may be database 302 shown in FIG. 3B, e.g., an MPDU information database. Thus, act 402 may create an entry in the database for each MPDU of the aggregated MPDUs. As described above and further herein, each entry in the database may include a pointer field that contains a memory location of a respective MPDU, e.g., memory location of a descriptor of the MPDU. Each entry may include a length field indicating a length of the respective MPDU. In some embodiments, act 402 may also include building the linked list (e.g., 300 in FIG. 3B) by updating the existing MSDU descriptors as described above.

In some embodiments, method 400 may include traversing the database to determine one or more MPDUs to be transmitted based on the ACK fields of the plurality of entries, at act 404. For example, as shown in FIG. 3B and described above, traversing starts from entry 304 at WinStart. According to the values in the ACK field 330, MPDUs 320 and 322 may be determined to be transmitted, whereas MPDU 322 will be skipped because the ACK field in the corresponding entry for MPDU 322 (entry 306) indicates that the MPDU is already received (from a previous transmission).

In some embodiments, method 400 may include determining a total aggregated MPDU length based on respective lengths of the one or more MPDUs to be transmitted, at act 406. As described above and further herein, act 406 may include scanning each of the entries in the MPDU information database which is associated with a respective MPDU, and retrieve the MPDU length from the length field in the entry. This act uses the previously stored MPDU length in the database without needing to scan the MSDUs in each of the MPDUs.

In some embodiments, method 400 may proceed to act 408 to further construct a frame, where the frame includes the one or more MPDUs to be transmitted and at least a field indicating the total aggregated MPDU length. For example, as a result of traversing the database shown in FIG. 3B, the MPDUs to be transmitted are constructed. The total aggregated MPDU length is determined based on accumulatively adding the values in the length field in corresponding entries of the MPDUs to be transmitted, in the manner as described in embodiments in FIG. 3B. In some embodiments, the transmission frame may include a physical header (preamble) indicating the total aggregated MPDU length. In some embodiments, the transmission frame may include a field indicating a transmission time (for the frame being transmitted), where the transmission time is based on the total aggregated MPDU length. Returning to FIG. 4, once the frame to be transmitted is constructed, method 400 may proceed to act 410 to transmit the frame to the OTA medium.

Although the acts in method 400 are shown in a particular order, it is appreciated that these acts may be performed in different manners. For example, act 402 for aggregating data units may be performed early, for example, as early as the MSDUs are received (from the upper layer), where the determining the total aggregated data unit length (act 406) may be performed at the last minute as soon as TXOP time is available and before transmitting. In other variations, the total aggregated MPDU length may be determined (in act 406) before, after, or at least partially in parallel to determining the one or more MPDUs to be transmitted (in act 404). Similarly, a preamble of the frame containing the transmission time based on the total aggregated MPDU length may be determined (in act 408) and transmitted (in act 410) while the one or more MPDUs to be transmitted in the frame are constructed.

Figure 4B:
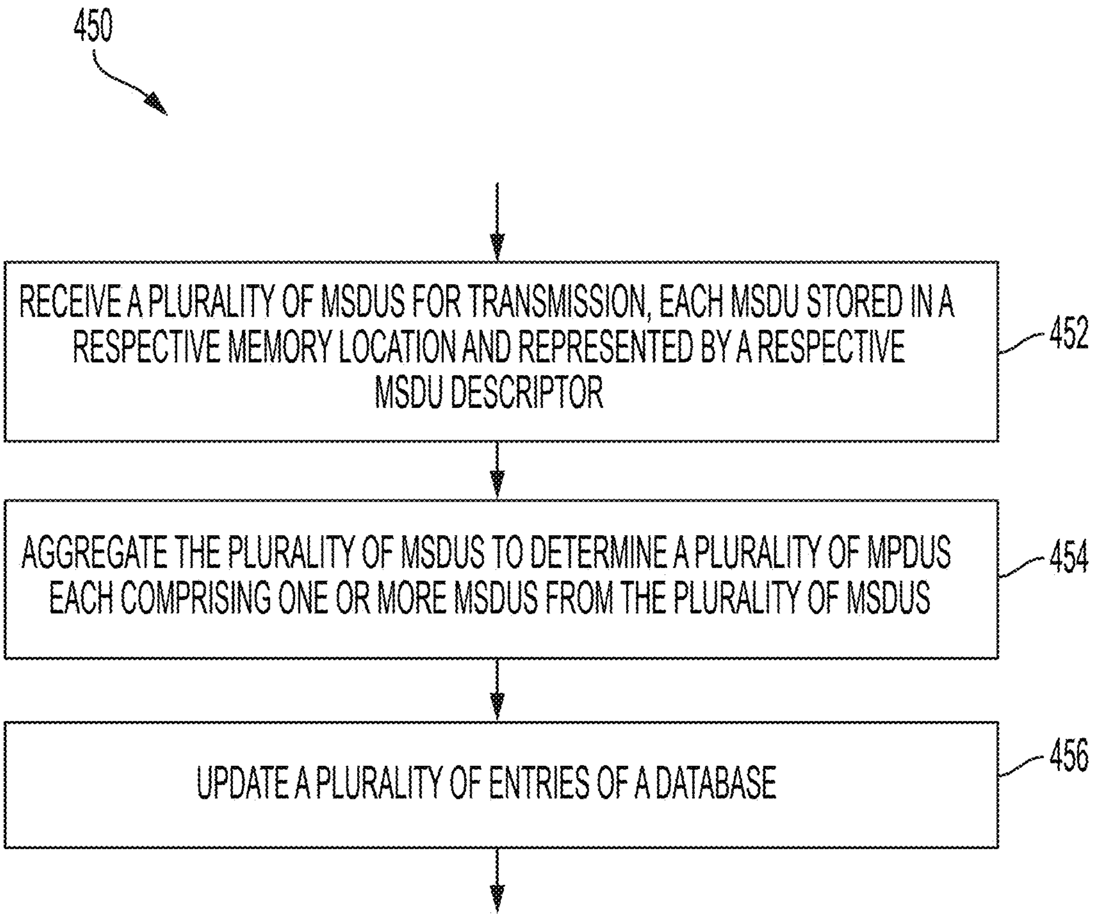
FIG. 4B is a flow diagram of an example process for determining a linked list of data units, according to some embodiments.

FIG. 4B is a flow diagram of an example process 450 for determining a linked list of data units, according to some embodiments. Method 450 may be implemented in the MAC of a device, such as any of the device shown in FIG. 1. Method 450 may include receiving a plurality of MSDUs for transmission, at act 452. For example, at act 452, the plurality of MSDUs may be received from an upper layer (e.g., a network layer), where each MSDU of the plurality of MSDUs is stored in a respective memory location and represented by a respective MSDU descriptor. In the example in FIG. 3A, the MSDUs 502-510 (for transmitting to STA0) are received in a sequential order. Method 450 may further include aggregating the plurality of MSDUs to determine a plurality of MPDUs each comprising one or more MSDUs from the plurality of MSDUs, at act 454. For example, with reference to FIG. 3A, the MSDUs 502-510 are aggregated into MPDU1 and MPDU2, where MPDU1 contains MPDUs represented by 502, 504, 506; and MPDU2 contains MSDUs represented by 508, 510, 512. In FIG. 3B, MSDUs represented by descriptors L1-L9 are aggregated into MPDUs 302, 302, 304, 306, 308.

Method 452 may further include updating a plurality of entries of a database, at act 456. For example, with reference to FIG. 3B, each entry in database 302 comprises a first field 322 containing a pointer (e.g., P1, P2, P3) to a respective MPDU of the plurality of MPDUs (320, 322, 324). For example, pointer P1 indicates a memory location of the MSDU descriptor of the MSDU (e.g., single-MSDU L1) in MPDU 320. In case of MPDU 322 which has more than one MSDU, pointer P2 points to the descriptor of the first MSDU (e.g., L2) of MPDU 322. In FIG. 3B, a linked list 300 is constructed that may include the plurality of MSDU descriptors as received. As described in embodiments in FIGS. 3A-3B, the MSDU descriptor of each of the plurality of MSDUs may include a pointer (e.g., a next field) containing the memory location of the MSDU descriptor of a succeeding MSDU in the plurality of MSDUs.

In such configuration, the aggregated MPDUs may be accessed or constructed by traversing the database and the linked list. For example, for each MPDU of the plurality of MPDUs, the first MSDU in the MPDU may be first accessed by the first field of a corresponding entry to the MPDU in the database (e.g., field 332 in database 302). Then, the remaining MSDU(s) in the MPDU (if the MPDU has more than one MSDU) may be accessed by the linked list by populating the one or more MSDUs in the MPDU by the next fields in the MSDU descriptors as described above.

In some embodiments, the techniques described in embodiments in FIGS. 1-4B may be applicable to Enhanced Distributed Channel Access (EDCA), as may be supported for QoS in one or more wireless protocols. EDCA allows a device to handle an MSDU differently depending on the user priority associated with the MSDU. For example, a device supporting EDCA may transmit the MSDUs in a higher priority earlier than transmitting the MSDUs in a lower priority.

In non-limiting examples, the UP information may be contained in a filed in each MSDU, e.g., the traffic ID, or TID field, where TID may include a value representing one of multiple UPs (e.g., 8 UPs). Thus, MSDUs as received may be aggregated (grouped) into 8 priority groups, and thus managed by 8 linked lists for each receiver device (STA). In some examples, an UP may correspond to one of access categories (ACs). For example, there may be 4 ACs, best effort (BE), background (BK), video (VI) and voice (VO). Thus, MSDUs as received may be aggregated into 4 priority groups each corresponding to one of the 4 ACs. Similarly, multiple databases (e.g., database 302 in FIG. 3B) may each be built by aggregating the MSDUs as they are received per priority (UP or AC) per receiver device (STA), in a similar manner as described above and further herein. In non-limiting examples, linked list 300 (FIG. 3B) may be a linked list of MSDU descriptors that are sorted for a specific AC of a STA.

Figure 5A:
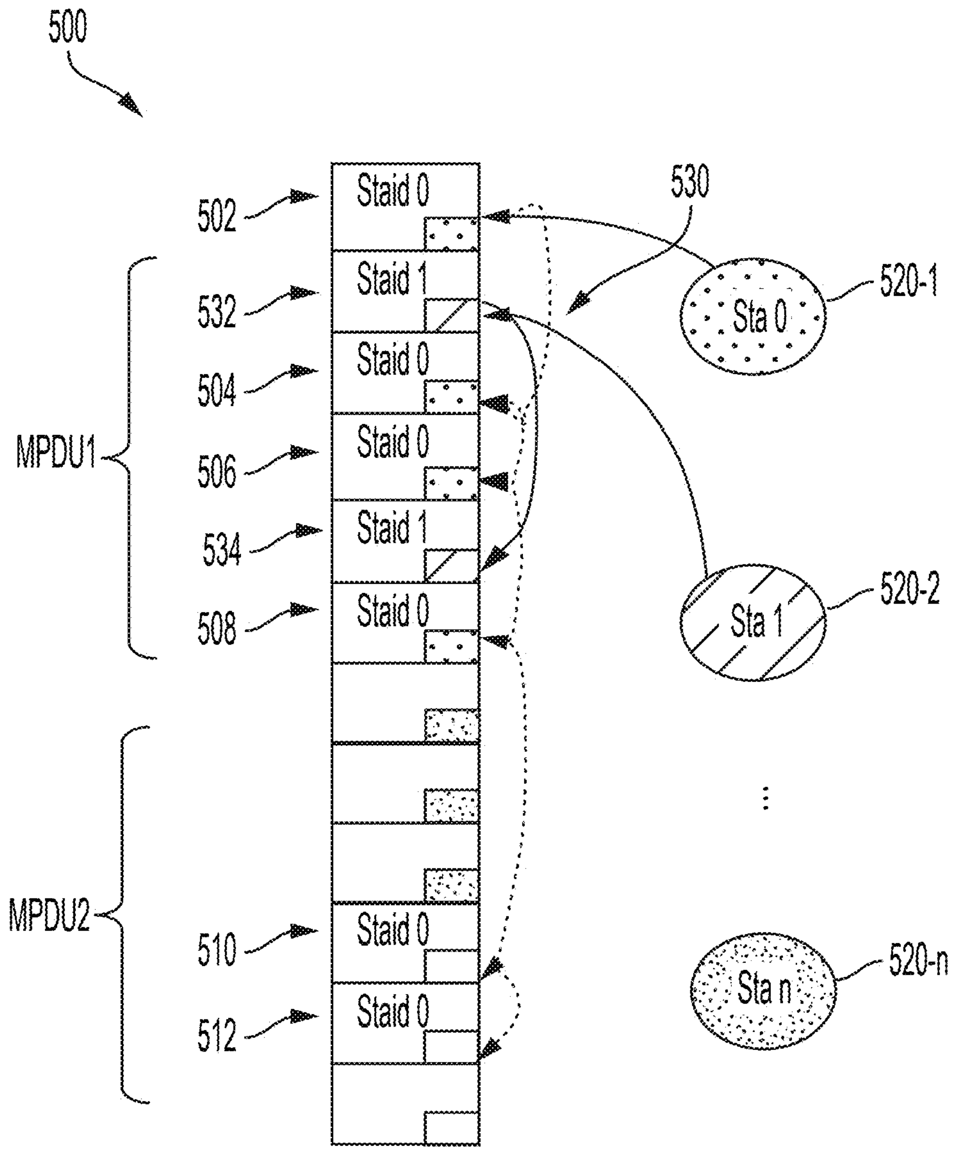
FIG. 5A illustrates linked list management for data unit descriptors, according to some embodiments.
Figure 5B:
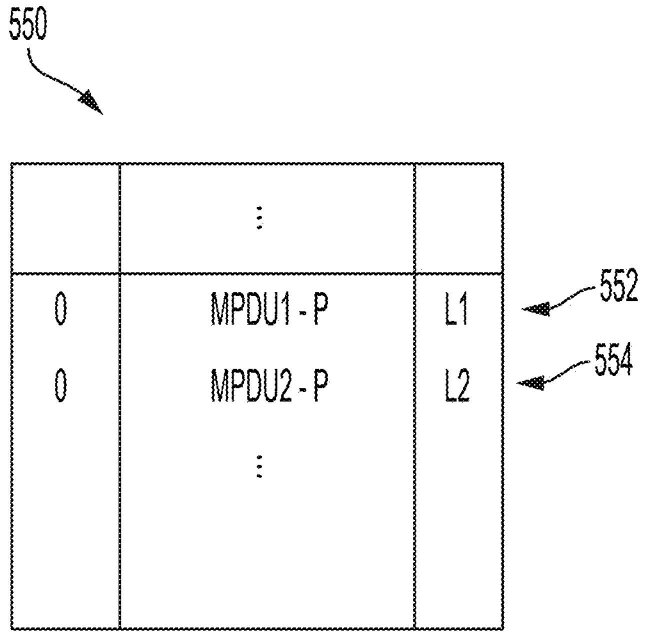
FIG. 5B illustrates a simplified database showing the pointers to the linked list in FIG. 5A, according to some embodiments.
Figure 5B:
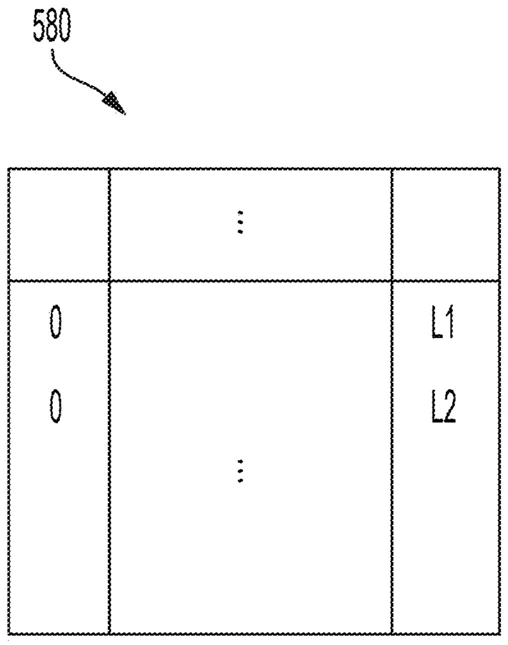

FIG. 5A illustrates linked list management for data unit descriptors, according to some embodiments. FIG. 5B illustrates a simplified database showing the pointers to the linked list in FIG. 5A, according to some embodiments. FIG. 5A is similar to FIG. 3A with the difference being that it shows two linked lists 500, 530 respectively for two STAs. For example, where list 500 maintains a linked list for MSDUs associated with a given AC for sending to receiver device STA0, another list 530 maintains a linked list for MSDUs with a given AC for sending to receiver device STA1. Similar to list 500, list 530 may contain a base MSDU descriptor 532, which also includes a pointer to the next MSDU descriptor 534, etc. In the example shown in FIG. 5B, the MSDUs may be aggregated to result respectively in databases 550 and 580 for sending to receiver devices STA0 and STA1, where databases 500 and 580 may be similar to database 302 (FIG. 3B). In other variations, a device may be capable of handling four ACs as supported by some IEEE 802.11 protocols, and thus four databases like database 302 may be built respectively for the four ACs, for each receiver device. Another four databases may be built for another receiver device.

The various embodiments described in FIGS. 1-5B above and further herein may be implemented to construct a frame for transmission for different ACs. In some embodiments, multiple databases like database 302 (FIG. 3B) may be used to construct a transmission (Tx) frame per receiver device and per AC. This may be implemented by the backoff mechanism as supported for EDCA. Under EDCA, each of the ACs may be associated with a respective backoff counter, and a given AC may be the first of the plurality of ACs to have its backoff counter expired, thus, the MPDUs associated with that given AC will be constructed and transmitted. In transmitting, the scheduler of the MAC may send a transmission command (Tx Command) to the transmission unit of the MAC. The Tx Command may include information about the transmission time which is associated with the total length of aggregated MPDUs in a frame, and other information such as one or more MPDUs to be transmitted where the one or more MPDUs are associated with the given AC for which the backoff counter expired. The MAC may access a respective linked list and database for the receiver device and AC associated with the Tx Command in a similar manner as described above in embodiments in FIGS. 3A-5B.

The database as described in embodiments in FIGS. 3-5B may be suitable for software or hardware implementation. In non-limiting examples, the MAC may include a scheduler implemented in software and a transmission unit implemented in hardware. For example, in FIG. 4A, act 402, which includes aggregation of MPDUs, may be performed by the scheduler in software to fill up the entries in the database, e.g., database 302 (FIG. 3B). The information in the database may be passed to the transmission unit, e.g., in the format of a transmission vector (Tx Vector), for the transmission unit to perform acts 404-410 in hardware. It is appreciated that other variations may be possible.

In some embodiments, to optimize the processing time, the database (e.g., database 302 in FIG. 3B) may be implemented as a shared memory for both the software and hardware units. For example, in the example as described above, the scheduler and the transmission unit may both read/write the database. In some embodiments, the database may be a shared memory to both the scheduler and the transmission unit. When the transmission unit receives acknowledgment signals for the MPDUs (e.g., block acknowledgment data), it may update a buffer corresponding to the ACK field in the database.

The techniques described in FIGS. 1-5B provide advantages over existing systems. For example, optimized processing time for constructing a transmission frame may be achieved by using a virtual linked list and a compact MPDU information database. The length of each MPDU from the aggregation in the database may be stored in the compact MPDU information database. At the time of transmitting, the MAC may use the pre-stored MPDU length in the MPDU information database and the virtual linked list to quickly determine the total length of aggregated MDPUs rather than populating all MSDUs in each MPDU. The database may be suitable for efficient software and/or hardware implementation, allowing fast database access to gurantee that a transmission frame can be ready to send after TXOP is available. The techniques described herein do not copy any of the MSDU descriptors, thus memory saving is also achieved.

The various methods or processes outlined herein may be implemented in hardware, e.g., one or more ICs, or coded as software that is executable on one or more processors that employ any one of a variety of operating systems or platforms. For example, any part of the methods described above may be implemented in hardware, software, or in combination. Additionally, such software may be written using any of numerous suitable programming languages and/or programming or scripting tools, and also may be compiled as executable machine language code.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A method for communicating packets in a wireless communication network, the method comprising, at a device:

aggregating a plurality of media access control (MAC) protocol data units (MPDUs), each having a respective length, to update a database comprising a plurality of entries, each entry comprising a first field indicating a pointer to a respective MPDU and a second field indicating a length of the respective MPDU, wherein the aggregating comprises, for each MDPU of the plurality of MPDUs:

determining a length of the MPDU; and generating a respective entry in the database for the MPDU, wherein the first field of the respective entry contains a pointer to a descriptor of the MPDU and the second field of the respective entry contains the length of the MPDU;

traversing the database to determine one or more MPDUs to be transmitted based on the first fields of the plurality of entries;

determining a total aggregated MPDU length based on respective lengths of the one or more MPDUs to be transmitted;

determining a frame containing the one or more MPDUs to be transmitted and at least a field indicating the total aggregated MPDU length; and transmitting the frame to over the air (OTA) medium.

2. The method of claim 1, further comprising:

for an MPDU of the one or more MPDUs in the frame, receiving an acknowledgment signal from a receiver device via the OTA medium, the acknowledgement signal indicating whether the MDPU is received by the receiver device; and based on the acknowledgment signal, updating a third field of the entry in the database that corresponds to the MPDU of the one or more MPDUs in the frame to indicate whether the MPDU is received.

3. The method of claim 2, wherein receiving the acknowledgment signal comprises:

receiving a block acknowledgment signal including the acknowledgment signal and one or more additional acknowledgment signals for other MPDUs in the frame; and mapping the block acknowledgment signal to the third fields of corresponding entries of the one or more MPDUs in the frame in the database.

4. The method of claim 2, wherein traversing the database to determine one or more MPDUs to be transmitted further comprises:

determining whether the third field of an entry of the plurality of entries in the database indicates the MPDU associated with the entry is received by a receiver device; and in response to determining that the third field of the entry indicates the MPDU associated with the entry is not received by a receiver device, including the MPDU associated with the entry in the one or more MPDUs to be transmitted; otherwise, skipping the entry.

5. The method of claim 4, wherein traversing the database further comprises determining a starting entry of the plurality of entries, wherein the starting entry is the first entry in the database for which the third field indicates that the MPDU associated with the starting entry is not received by a receiver device.

6. The method of claim 1, further comprising:

receiving a plurality of MAC service data units (MSDUs);

categorizing each of the plurality of MSDUs into a respective one of a plurality of access categories (ACs); and aggregating the plurality of MSDUs into the plurality of MPDUs, each of the plurality of MPDUs including one or more MSDUs from the plurality of MSDUs that are categorized into a first AC of the plurality of ACs.

7. The method of claim 6, wherein:

the plurality of MPDUs are a first set of MPDUs associated with the first AC;

the database is a first database associated with the first AC; and the method further comprises:

aggregating a second set of MPDUs associated with a second AC of the plurality of ACs to update a second database comprising a plurality of entries each comprising a first field indicating a pointer to a respective MPDU in the second set of MPDUs and a second field indicating a length of the respective MPDU;

traversing the second database to determine one or more MPDUs to be transmitted associated with the second AC based on the first fields of the plurality of entries;

determining a total aggregated MPDU length associated with the second AC based on respective lengths of the one or more MPDUs to be transmitted associated with the second AC;

determining a frame associated with the second AC, the frame containing the one or more MPDUs to be transmitted associated with the second AC, wherein the frame comprises a field indicating a transmission time, the transmission time being determined based on the total aggregated MPDU length associated with the second AC; and transmitting the frame associated with the second AC to the OTA medium.

8. An apparatus for communication in a wireless network, the apparatus comprising one or more processors configured to perform one or more operations comprising:

aggregating a plurality of media access control (MAC) protocol data units (MPDUs), each having a respective length, to update a database comprising a plurality of entries, each entry comprising a first field indicating a pointer to a respective MPDU and a second field indicating a length of the respective MPDU, wherein the aggregating comprises, for each MDPU of the plurality of MPDUs:

determining a length of the MPDU; and generating a respective entry in the database for the MPDU, wherein the first field of the respective entry contains a pointer to a descriptor of the MPDU and the second field of the respective entry contains the length of the MPDU;

traversing the database to determine one or more MPDUs to be transmitted based on the first fields of the plurality of entries;

determining a total aggregated MPDU length based on respective lengths of the one or more MPDUs to be transmitted;

determining a frame containing the one or more MPDUs to be transmitted and at least a field indicating the total aggregated MPDU length; and transmitting the frame to over the air (OTA) medium.

9. The apparatus of claim 8, wherein the one or more operations further comprise:

for an MPDU of the one or more MPDUs in the frame, receiving an acknowledgment signal from a receiver device via the OTA medium, the acknowledgement signal indicating whether the MDPU is received by the receiver device; and based on the acknowledgment signal, updating a third field of the entry in the database that corresponds to the MPDU of the one or more MPDUs in the frame to indicate whether the MPDU is received.

10. The apparatus of claim 9, wherein receiving the acknowledgment signal comprises:

receiving a block acknowledgment signal including the acknowledgment signal and one or more additional acknowledgment signals for other MPDUs in the frame; and mapping the block acknowledgment signal to the third fields of corresponding entries of the one or more MPDUs in the frame in the database.

11. The apparatus of claim 9, wherein traversing the database to determine one or more MPDUs to be transmitted further comprises:

determining whether the third field of an entry of the plurality of entries in the database indicates the MPDU associated with the entry is received by a receiver device; and in response to determining that the third field of the entry indicates the MPDU associated with the entry is not received by a receiver device, including the MPDU associated with the entry in the one or more MPDUs to be transmitted; otherwise, skipping the entry.

12. The apparatus of claim 11, wherein traversing the database further comprises determining a starting entry of the plurality of entries, wherein the starting entry is the first entry in the database for which the third field indicates that the MPDU associated with the starting entry is not received by a receiver device.

13. The apparatus of claim 8, wherein the one or more operations further comprise:

receiving a plurality of MAC service data units (MSDUs);

categorizing each of the plurality of MSDUs into a respective one of a plurality of access categories (ACs); and aggregating the plurality of MSDUs into the plurality of MPDUs, each of the plurality of MPDUs including one or more MSDUs from the plurality of MSDUs that are categorized into a first AC of the plurality of ACs.

14. The apparatus of claim 13, wherein:

the plurality of MPDUs are a first set of MPDUs associated with the first AC;

the database is a first database associated with the first AC; and the one or more operations further comprise:

aggregating a second set of MPDUs associated with a second AC of the plurality of ACs to update a second database comprising a plurality of entries each comprising a first field indicating a pointer to a respective MPDU in the second set of MPDUs and a second field indicating a length of the respective MPDU;

traversing the second database to determine one or more MPDUs to be transmitted associated with the second AC based on the first fields of the plurality of entries;

determining a total aggregated MPDU length associated with the second AC based on respective lengths of the one or more MPDUs to be transmitted associated with the second AC;

determining a frame associated with the second AC, the frame containing the one or more MPDUs to be transmitted associated with the second AC, wherein the frame comprises a field indicating a transmission time, the transmission time being determined based on the total aggregated MPDU length associated with the second AC; and transmitting the frame associated with the second AC to the OTA medium.

15. A method for communicating packets in a wireless communication network, the method comprising, at a device, in response to a transmission opportunity:

traversing a database associated with a receiver device, the receiver device associated with the transmission opportunity, wherein the database comprises a plurality of entries, each entry comprising a first field indicating a pointer to a respective media access control (MAC) protocol data unit (MPDU) and a second field indicating a length of the respective MPDU, wherein the traversing comprises:

determining one or more MPDUs to be transmitted based on the first fields of the plurality of entries in the database; and determining a total aggregated MPDU length based on respective lengths of the one or more MPDUs to be transmitted;

determining a frame containing the one or more MPDUs to be transmitted and at least a field indicating the total aggregated MPDU length; and transmitting the frame to over the air (OTA) medium.

16. The method of claim 15, further comprising:

for an MPDU of the one or more MPDUs in the frame, receiving an acknowledgment signal from a receiver device via the OTA medium, the acknowledgement signal indicating whether the MDPU is received by the receiver device; and based on the acknowledgment signal, updating a third field of the entry in the database that corresponds to the MPDU of the one or more MPDUs in the frame to indicate whether the MPDU is received.

17. The method of claim 16, wherein receiving the acknowledgment signal comprises:

receiving a block acknowledgment signal including the acknowledgment signal and one or more additional acknowledgment signals for other MPDUs in the frame; and mapping the block acknowledgment signal to the third fields of corresponding entries of the one or more MPDUs in the frame in the database.

18. The method of claim 16, wherein traversing the database to determine one or more MPDUs to be transmitted further comprises:

determining whether the third field of an entry of the plurality of entries in the database indicates the MPDU associated with the entry is received by a receiver device; and in response to determining that the third field of the entry indicates the MPDU associated with the entry is not received by a receiver device, including the MPDU associated with the entry in the one or more MPDUs to be transmitted; otherwise, skipping the entry.

19. The method of claim 18, wherein traversing the database further comprises determining a starting entry of the plurality of entries, wherein the starting entry is the first entry in the database for which the third field indicates that the MPDU associated with the starting entry is not received by a receiver device.

20. The method of claim 15, wherein:

the transmission opportunity is a first transmission opportunity associated with a first access category (AC) and the database is a first database associated with the first AC; and the method further comprises, at the device, in response to a second transmission opportunity associated with a second AC:

traversing a second database associated with the second AC and associated with the receiver device, wherein the second database comprises a plurality of entries, each entry comprising a first field indicating a pointer to a respective MPDU and a second field indicating a length of the respective MPDU, wherein traversing the second database comprises:

determining one or more MPDUs to be transmitted for the second transmission opportunity, based on the first fields of the plurality of entries in the second database; and determining a total aggregated MPDU length for the second transmission opportunity based on respective lengths of the one or more MPDUs to be transmitted for the second transmission opportunity;

determining another frame containing the one or more MPDUs to be transmitted for the second transmission opportunity and at least a field indicating the total aggregated MPDU length for the second transmission opportunity; and transmitting the another frame to the OTA medium.

21. A method for managing data packets in a wireless communication network, the method comprising, at a device:

receiving a plurality of media access control (MAC) service data units (MSDUs) for transmission, wherein each MSDU of the plurality of MSDUs is stored in a respective memory location and represented by a respective MSDU descriptor;

aggregating the plurality of MSDUs to determine a plurality of MAC protocol data units (MPDUs) each comprising one or more MSDUs from the plurality of MSDUs; and updating a plurality of entries of a database each entry comprising a first field containing a pointer to a respective MPDU of the plurality of MPDUs, the pointer indicating a memory location of the MSDU descriptor of a first MSDU in the respective MPDU, wherein the MSDU descriptor of each of the plurality of MSDUs has a next field containing the memory location of the MSDU descriptor of a succeeding MSDU in the plurality of MSDUs;

whereby the plurality of MPDUs are accessible by traversing the database in a manner in which, for each MPDU of the plurality of MPDUs:

the first MSDU in the MPDU is accessible by the first field of a corresponding entry to the MPDU in the database; and if the MPDU has more than one MSDU, remaining MSDUs in the MPDU are accessible by the next fields in the MSDU descriptors of the one or more MSDUs in the MPDU.

22. The method of claim 21, wherein:

updating the plurality of entries of the database further comprises updating a third field of each entry in the database to indicate whether the MPDU corresponding to the entry is received by an intended receiver device;

whereby during access of the plurality of MPDUs, an MPDU of the plurality of MPDUs is skipped if the third field of the corresponding entry to the MPDU in the database indicates that the MPDU is received by the intended receiver device.

23. The method of claim 21, wherein:

the plurality of MSDUs are each associated with a respective user priority (UP);

aggregating the plurality of MSDUs comprises: for an UP, determining a respective plurality of MPDUs each comprising one or more MSDUs from the plurality of MSDUs associated with the UP; and updating the plurality of entries of the database comprises updating the plurality of entries of a respective database associated with the UP, each entry comprising a first field containing a pointer to a respective MPDU of the respective plurality of MPDUs associated with the UP, the pointer indicates a memory location of the MSDU descriptor of a first MSDU in the respective MPDU, wherein the MSDU descriptor of each of the respective plurality of MSDUs has a next field containing the memory location of the MSDU descriptor of a succeeding MSDU in the plurality of MSDUs;

whereby the respective plurality of MPDUs associated with the UP are accessible by traversing the respective database associated with the UP in a manner in which, for each MPDU of the respective plurality of MPDUs associated with the UP:

the first MSDU in the MPDU is accessible by the first field of a corresponding entry to the MPDU in the respective database associated with the UP; and if the MPDU has more than one MSDU, remaining MSDUs in the MPDU are accessible by the next fields in the MSDU descriptors of the one or more MSDUs in the MPDU.

* * * * *